(12) United States Patent
Kurioka et al.

(10) Patent No.: US 7,453,648 B2
(45) Date of Patent: *Nov. 18, 2008

(54) ZOOM LENS SYSTEM, IMAGING DEVICE AND CAMERA

(75) Inventors: Yoshiaki Kurioka, Osaka (JP); Keiki Yoshitsugu, Hyogo (JP); Kyoichi Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/605,308

(22) Filed: Nov. 29, 2006

(65) Prior Publication Data

US 2007/0121219 A1    May 31, 2007

(30) Foreign Application Priority Data

Nov. 30, 2005    (JP)    ............................. 2005-347204

(51) Int. Cl.
*G02B 15/14*    (2006.01)
(52) U.S. Cl. ...................................... 359/682; 359/689
(58) Field of Classification Search ......... 359/680–682, 359/689
See application file for complete search history.

(56) References Cited

U.S. PATENT DOCUMENTS 7,046,452 B2    5/2006    Ori
7,061,685 B2    6/2006    Itoh
7,215,482 B2 *  5/2007    Matsusaka ................... 359/682
7,310,191 B2 *  12/2007   Kurioka ...................... 359/682

FOREIGN PATENT DOCUMENTS

| JP | 11-149044 A | 6/1999 |
| JP | 2005-84597 A | 3/2005 |
| JP | 2005-134746 A | 5/2005 |

* cited by examiner

*Primary Examiner*—Scott J Sugarman
(74) *Attorney, Agent, or Firm*—McDermott Will & Emery LLP

(57) ABSTRACT

A zoom lens system comprising a first lens unit having negative power, a second lens unit having positive power and a third lens unit having positive power, wherein in zooming from a wide-angle limit to a telephoto limit, the lens units move respectively along an optical axis in such a manner that an interval between the first lens unit and the second lens unit decreases while an interval between the second lens unit and the third lens unit changes so that variable magnification is achieved, the first lens unit comprises one object side negative lens element and one image side positive lens element with a convex surface facing the object side, which have an aspheric surface, and the conditions: $n12>1.88$ and $v12<26$ ($n12$ and $v12$ are refractive index and Abbe number, respectively, of the image side positive lens element of the first lens unit) are satisfied.

15 Claims, 9 Drawing Sheets

SPHERICAL ABERRATION (mm)   ASTIGMATISM (mm)   DISTORTION (%)

FIG. 4A  FIG. 4B  FIG. 4C
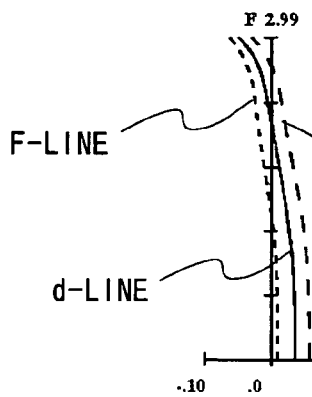
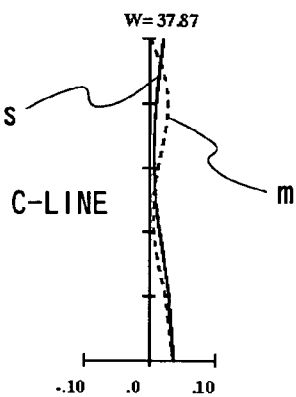
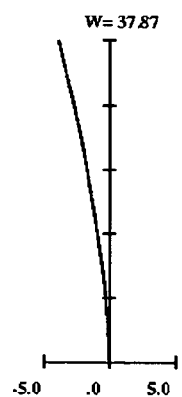
FIG. 4D  FIG. 4E  FIG. 4F
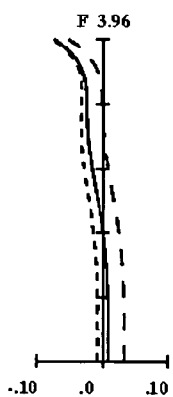
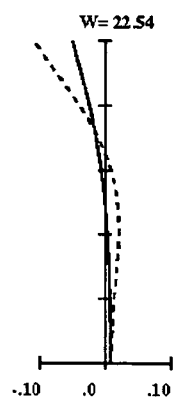
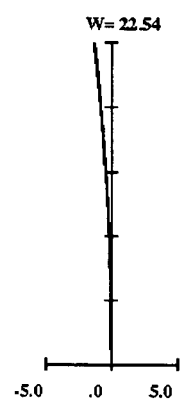
FIG. 4G  FIG. 4H  FIG. 4I
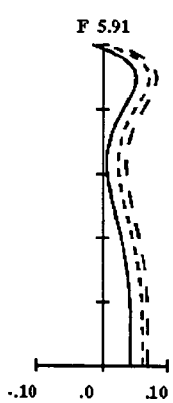
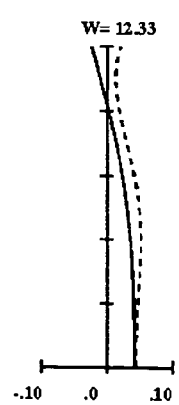
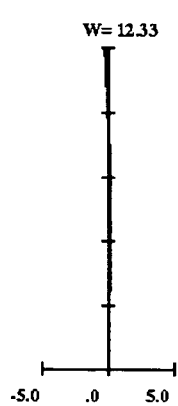
SPHERICAL ABERRATION (mm)   ASTIGMATISM (mm)   DISTORTION (%)

SPHERICAL ABERRATION (mm)   ASTIGMATISM (mm)   DISTORTION (%)

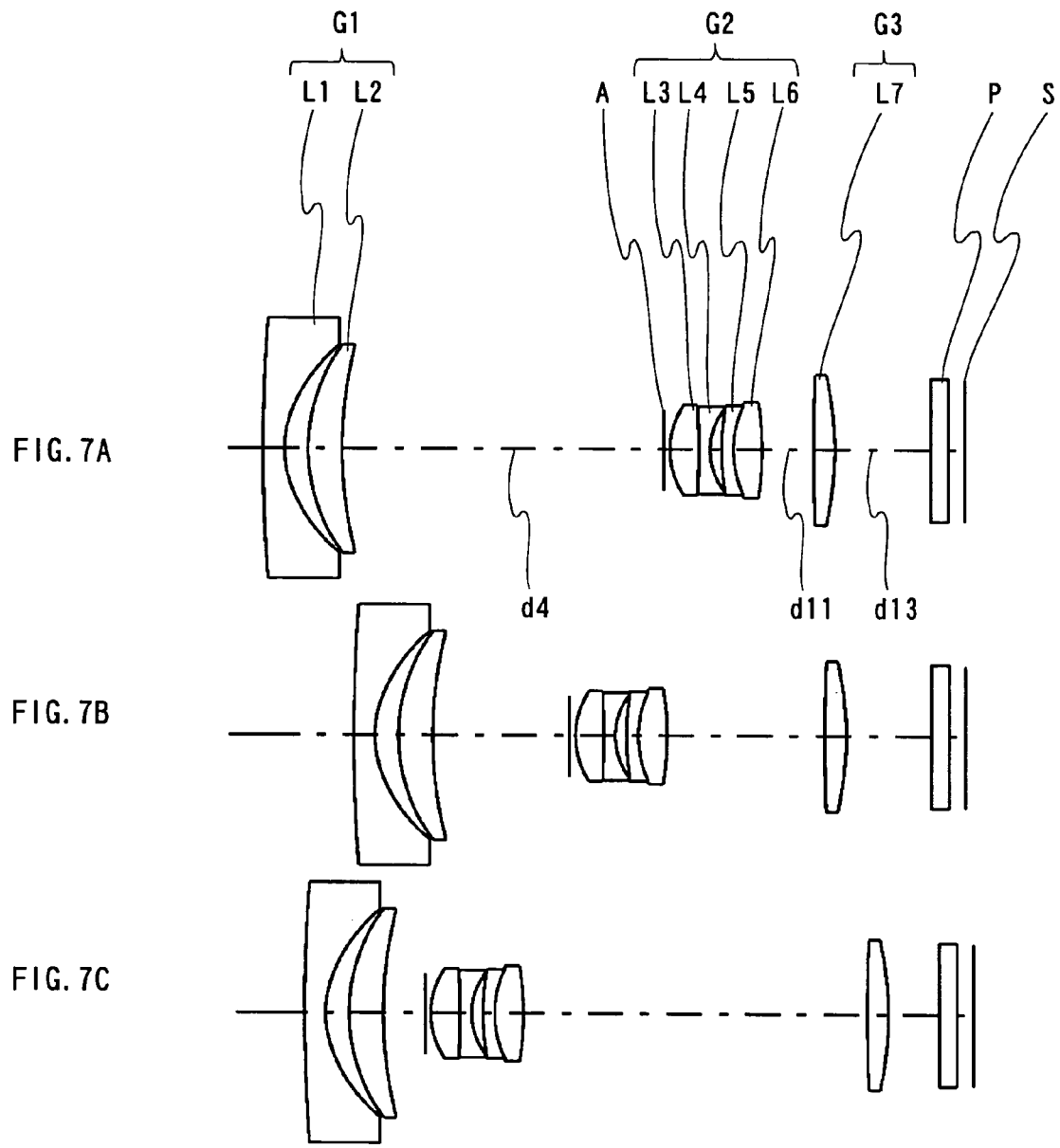

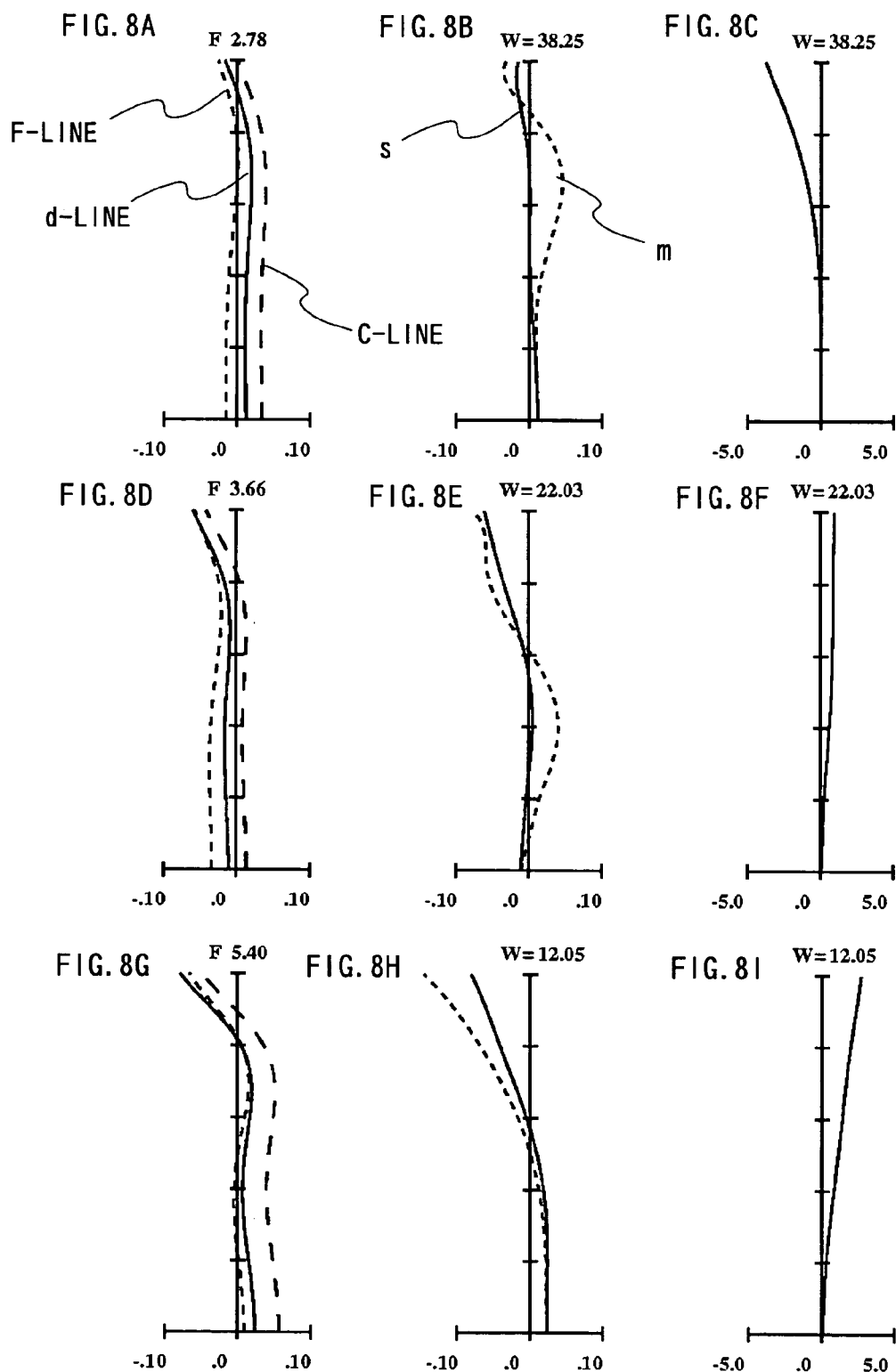

ZOOM LENS SYSTEM, IMAGING DEVICE AND CAMERA

CROSS-REFERENCE TO RELATED APPLICATION

This application is based on application No. 2005-347204 filed in Japan on Nov. 30, 2005, the content of which is hereby incorporated by reference.

BACKGROUND

1. Technical Field

The present invention relates to a zoom lens system, an imaging device and a camera. In particular, the present invention relates to: a zoom lens system that has a high resolution, high capability of compensating curvature of field, and a short overall optical length at the time of non-use; an imaging device employing this zoom lens system; and a camera employing this imaging device.

2. Description of the Background Art

In the prior art, a large number of optical instruments have been developed that form an image of a photographic object onto an image sensor through a lens and then acquire the object image as an image. Recently, products such as digital still cameras and digital video cameras are spreading. Then, with the increase in the number of users, desire on these products is also growing. Among various types of these products, optical instruments having a zoom ratio of approximately three are comparatively small and still have an optical zoom function. Thus, these types are spreading remarkably widely as digital cameras of compact type or stylish type.

In the digital cameras of compact type, for the purpose of the property of easy carrying, further size reduction of the instruments is desired. In order to achieve the further size reduction of the digital cameras, the lens arrangement need be adopted such that the overall optical length (the distance measured from the top of the most object side lens surface of the entire lens system to the image surface) at the time of non-use should be reduced while lens elements that extend out relative to the main body by means of a multi-stage lens barrel at the time of use could be accommodated into the main body.

Meanwhile, as zoom lens systems suitable for digital still cameras of compact type, a large number of zoom lens systems of three-unit construction have been proposed that, for example, in order from the object side to the image side, comprise a first lens unit having negative optical power, a second lens unit having positive optical power, and a third lens unit having positive optical power.

In such a zoom lens system of three-unit construction, in zooming (magnification change) from a wide-angle limit to a telephoto limit, the air space between the first lens unit and the second lens unit decreases monotonically, while the air space between the second lens unit and the third lens unit varies, and while the third lens unit is fixed or moved.

Focus adjustment in the zoom lens system of three-unit construction is performed by moving the first lens unit or the third lens unit in the optical axis direction. In particular, from the perspective of size reduction of the entire optical instrument, in many cases, the focus adjustment is performed using the third lens unit which is less heavy, so that focusing onto the photographic object is achieved ranging from the infinity to a short distance. In contrast, when the focus adjustment is performed using the first lens unit, the first lens unit is larger than the third lens unit and hence requires a large size motor. This causes a tendency of size increase in the entire optical instrument.

The third lens unit having positive optical power has the effects of compensating curvature of field and bringing into a telecentric state the incident light onto the imaging surface. Further, in many cases, the third lens unit is constructed from one or two lens elements having a small outer diameter, and hence can be driven at a high speed using a small size motor. Thus, when the third lens unit is adopted as a lens unit for focus adjustment, an optical instrument is realized that has a reduced size and permits rapid focusing.

The first lens unit and the second lens unit move in parallel to the optical axis along a cam groove formed in a cylindrical cam. In the cam groove, a groove for zooming and a groove for the time of non-use are connected to each other. The groove for the time of non-use reduces the interval between the lens units and moves all the three lens units to the image sensor side. This configuration reduces the overall optical length at the time of non-use. In this case, if the thickness of each lens unit could be reduced, the overall optical length at the time of non-use would be reduced further.

As such, in the prior art, design has been performed such that the zoom lens system should have the above configuration where the size is reduced in the part relevant to focus adjustment and in the entire lens system at the time of non-use, so that the overall optical length of the digital still camera has been reduced.

For example, Japanese Laid-Open Patent Publication No. 2005-134746 discloses a three-unit zoom lens, in order from the object side to the image side, comprising: a first lens unit having negative optical power that is composed of a negative-powered lens having an aspheric surface and a positive-powered lens; a second lens unit having positive optical power; and a third lens unit having positive optical power. In this three-unit zoom lens, the most object side negative-powered lens of the first lens unit is provided with a high refractive index, so that the lens thickness in the periphery part is reduced in a state that curvature of field at a wide-angle limit is compensated. This reduces the thickness of the entire first lens unit and hence the size of the optical system.

Further, for example, Japanese Laid-Open Patent Publication No. 2005-084597 discloses a three-unit zoom lens that, in order from the object side to the image side, comprises a first lens unit having negative optical power, a second lens unit having positive optical power and provided with a diaphragm, and a third lens unit having positive optical power, wherein in magnification change, the first lens unit moves relatively in a direction approaching to the second lens unit, while the second lens unit monotonically moves to the object side, and while the third lens unit moves to the object side and then moves reverse to the image side, and wherein when the object distance is infinity, the position of the third lens unit at a wide-angle limit is located on the object side relative to the position at a telephoto limit. In this three-unit zoom lens, a condition is set forth concerning the focal length of the first lens unit in such a manner that the compensation of curvature of field and the size reduction of the optical system can be achieved simultaneously.

Nevertheless, in the configuration of the three-unit zoom lens disclosed in Japanese Laid-Open Patent Publication No. 2005-134746, the positive-powered lens on the image side of the first lens unit has a low refractive index and still is a spherical lens. This causes a problem of insufficiency in the compensation of curvature of field.

Further, in the configuration of the three-unit zoom lens disclosed in Japanese Laid-Open Patent Publication No.

2005-084597, for the purpose of size reduction, the focal length of the first lens unit is set up rather short. Nevertheless, in this case, although the diameter of the lens can be constructed comparatively small, when the first lens unit is composed of two lenses, the optical power becomes excessive in the object side lens. Further, the thickness of the image side lens also increases for the purpose of compensation of chromatic aberration. This causes a problem of increase in the overall optical length at the time of non-use.

SUMMARY

An object of the present invention is to provide: a zoom lens system that has a high resolution, high capability of compensating curvature of field, and a short overall optical length at the time of non-use; an imaging device employing this zoom lens system; and a camera employing this imaging device.

The novel concepts disclosed herein were achieved in order to solve the foregoing problems in the conventional art, and herein is disclosed:

a zoom lens system for forming an optical image of an object with a variable magnification, in order from the object side to the image side, comprising: a first lens unit having negative optical power; a second lens unit having positive optical power; and a third lens unit having positive optical power, wherein in zooming from a wide-angle limit to a telephoto limit, the lens units move respectively along an optical axis in such a manner that an interval between the first lens unit and the second lens unit decreases while an interval between the second lens unit and the third lens unit changes so that the variable magnification is achieved, the first lens unit comprises: one object side negative lens element; and one image side positive lens element with a convex surface facing the object side, each of the two lens elements constituting the first lens unit has an aspheric surface, and the following conditions (1) and (2) are satisfied:

$$n12 > 1.88 \quad (1)$$

$$\nu 12 < 26 \quad (2)$$

where, n12 is a refractive index of the image side positive lens element of the first lens unit, and $\nu 12$ is an Abbe number of the image side positive lens element of the first lens unit.

The novel concepts disclosed herein were achieved in order to solve the foregoing problems in the conventional art, and herein is disclosed:

an imaging device capable of converting an optical image of a photographic object into an electric image signal and then outputting the signal, comprising:

a zoom lens system that forms the optical image of the photographic object with a variable magnification; and an image sensor that converts the optical image of the photographic object formed by the zoom lens system into the electric image signal, wherein the zoom lens system, in order from the object side serving as the photographic object side to the image side, comprises: a first lens unit having negative optical power; a second lens unit having positive optical power; and a third lens unit having positive optical power, in zooming from a wide-angle limit to a telephoto limit, the lens units move respectively along an optical axis in such a manner that an interval between the first lens unit and the second lens unit decreases while an interval between the second lens unit and the third lens unit changes so that the variable magnification is achieved, the first lens unit comprises: one object side negative lens element; and one image side positive lens element with a convex surface facing the object side, each of the two lens elements constituting the first lens unit has an aspheric surface, and the following conditions (1) and (2) are satisfied:

$$n12 > 1.88 \quad (1)$$

$$\nu 12 < 26 \quad (2)$$

where, n12 is a refractive index of the image side positive lens element of the first lens unit, and $\nu 12$ is an Abbe number of the image side positive lens element of the first lens unit.

The novel concepts disclosed herein were achieved in order to solve the foregoing problems in the conventional art, and herein is disclosed:

a camera capable of shooting a photographic object and then outputting its image as an electric image signal, comprising:

an imaging device including a zoom lens system that forms the optical image of the photographic object with a variable magnification, and an image sensor that converts the optical image of the photographic object formed by the zoom lens system into the electric image signal, wherein the zoom lens system, in order from the object side serving as the photographic object side to the image side, comprises: a first lens unit having negative optical power; a second lens unit having positive optical power; and a third lens unit having positive optical power, in zooming from a wide-angle limit to a telephoto limit, the lens units move respectively along an optical axis in such a manner that an interval between the first lens unit and the second lens unit decreases while an interval between the second lens unit and the third lens unit changes so that the variable magnification is achieved, the first lens unit comprises: one object side negative lens element; and one image side positive lens element with a convex surface facing the object side, each of the two lens elements constituting the first lens unit has an aspheric surface, and the following conditions (1) and (2) are satisfied:

$$n12 > 1.88 \quad (1)$$

$$\nu 12 < 26 \quad (2)$$

where, n12 is a refractive index of the image side positive lens element of the first lens unit, and $\nu 12$ is an Abbe number of the image side positive lens element of the first lens unit.

The present invention provides: a zoom lens system that has a high resolution, capability of satisfactory compensation of curvature of field, a reduced thickness of the first lens unit, and a short overall optical length at the time of non-use; and an imaging device employing this zoom lens system. The present invention further provides a small and high performance camera employing this imaging device.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4I are longitudinal aberration diagrams of a zoom lens system according to Example 2;

FIGS. 7A to 7C are configuration diagrams of a zoom lens system according to Embodiment 4 (Example 4);

FIGS. 8A to 8I are longitudinal aberration diagrams of a zoom lens system according to Example 4.

DESCRIPTION OF THE PREFERRED EMBODIMENTS

Embodiments 1 to 4

Figure 1A:
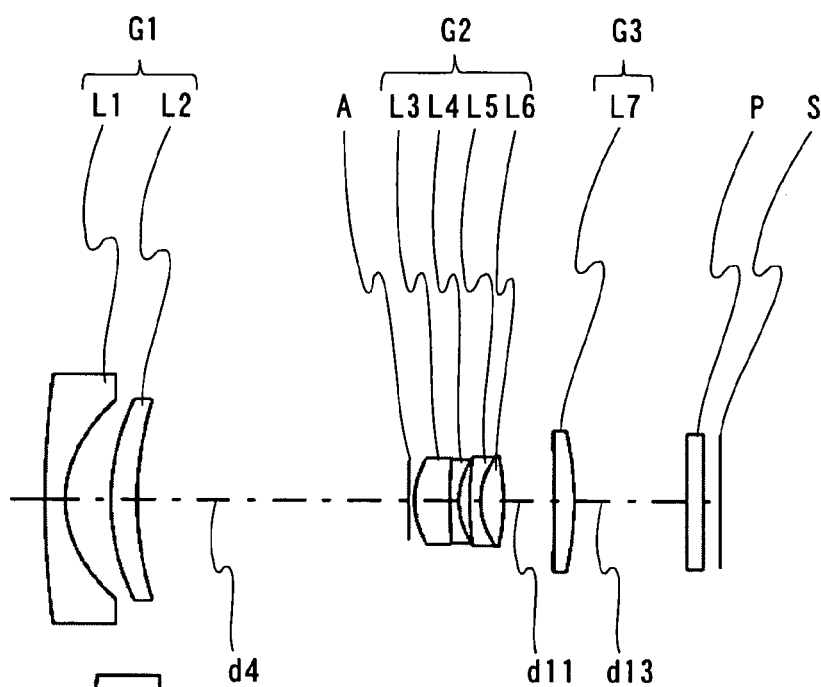
FIGS. 1A to 1C are configuration diagrams of a zoom lens system according to Embodiment 1 (Example 1)
Figure 1B:
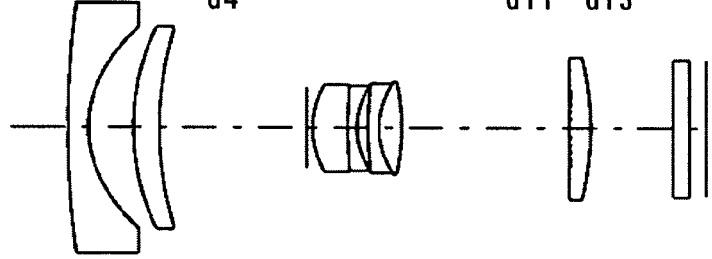
Figure 1C:
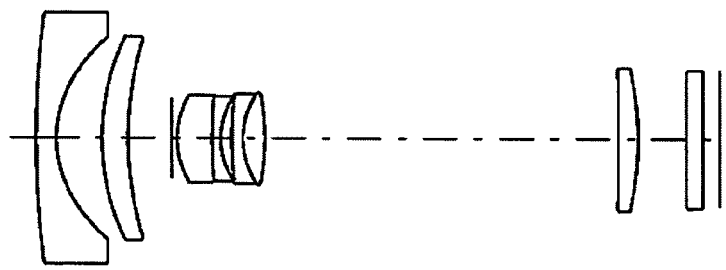
Figure 2A:
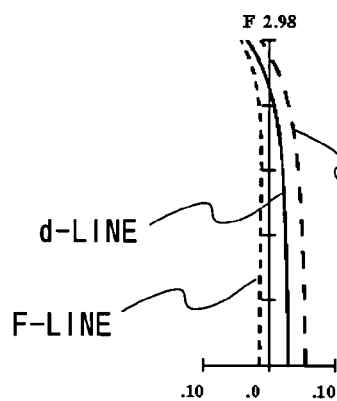
FIGS. 2A to 2I are longitudinal aberration diagrams of a zoom lens system according to Example 1.
Figure 2B:
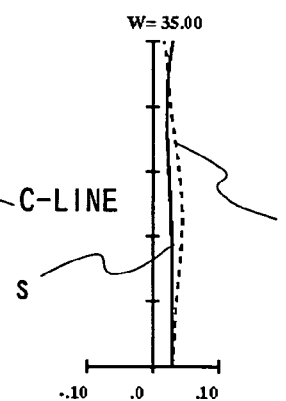
Figure 2C:
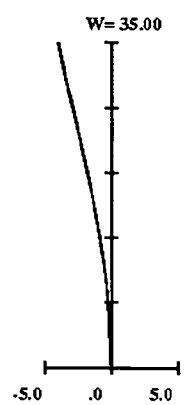
Figure 2D:
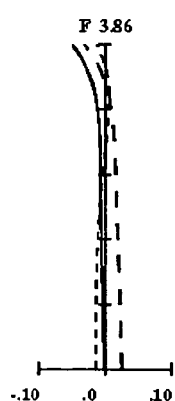
Figure 2E:
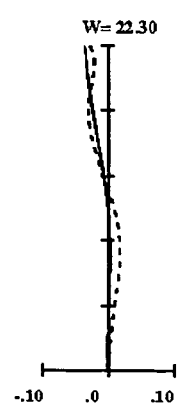
Figure 2F:
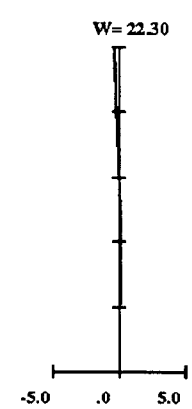
Figure 2G:
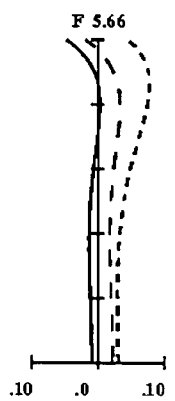
Figure 2H:
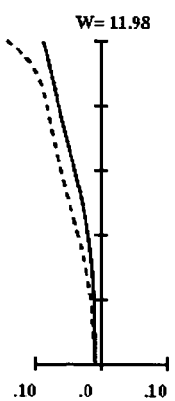
Figure 2I:
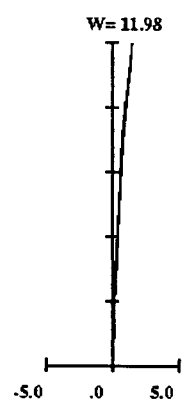
Figure 3A:
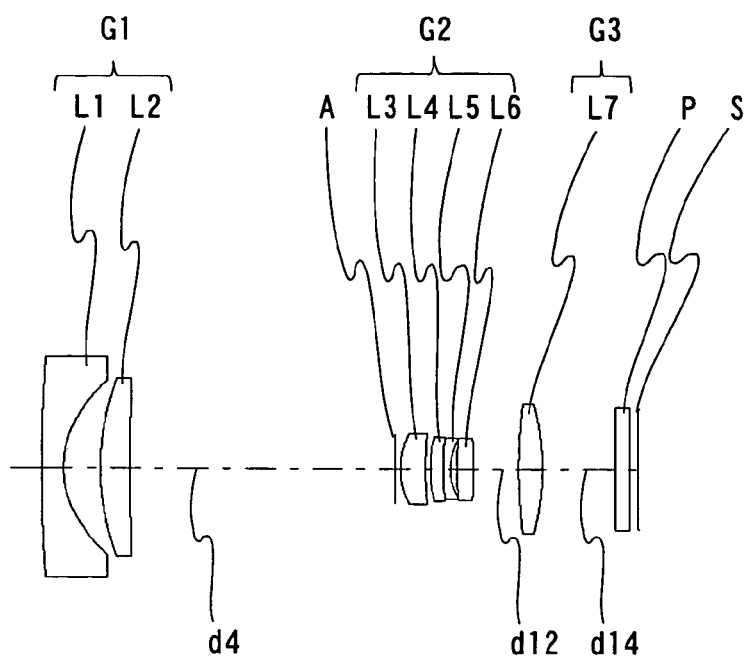
FIGS. 3A to 3C are configuration diagrams of a zoom lens system according to Embodiment 2 (Example 2)
Figure 3B:
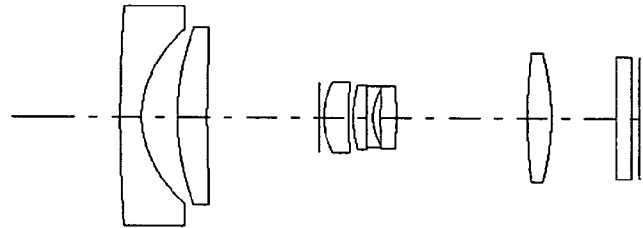
Figure 3C:
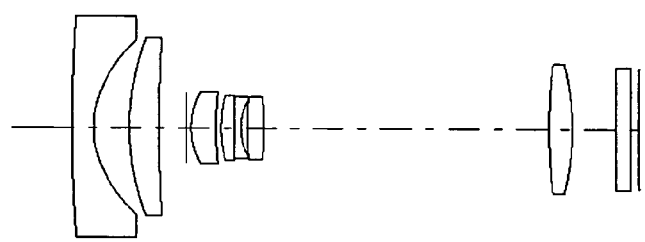
Figure 5A:
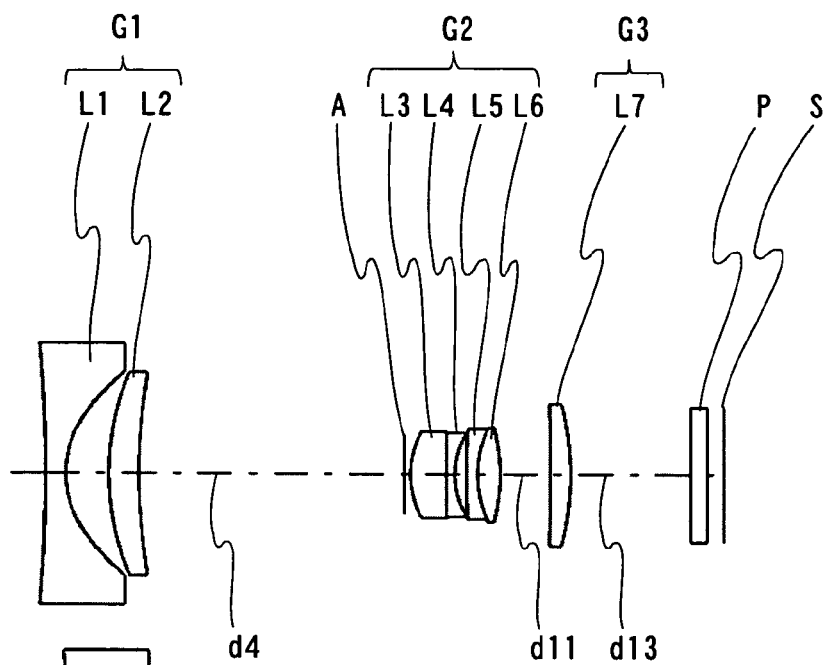
FIGS. 5A to 5C are configuration diagrams of a zoom lens system according to Embodiment 3 (Example 3)
Figure 5B:
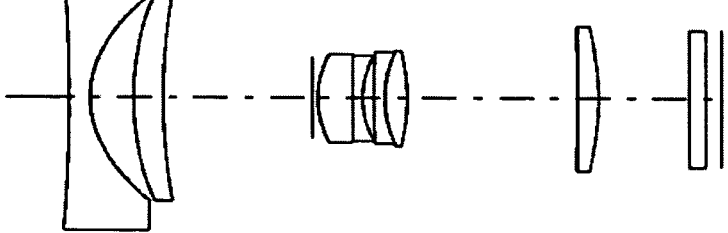
Figure 5C:
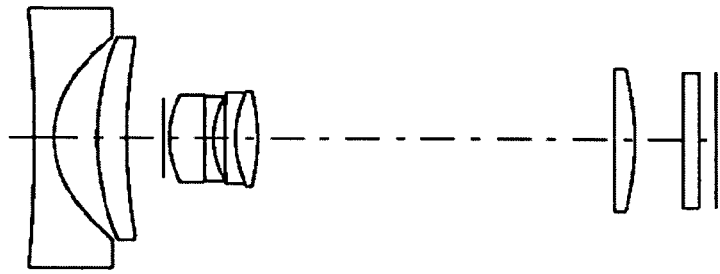
Figure 6A:
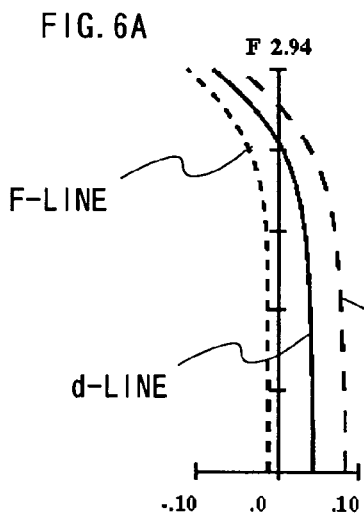
FIGS. 6A to 6I are longitudinal aberration diagrams of a zoom lens system according to Example 3.
Figure 6B:
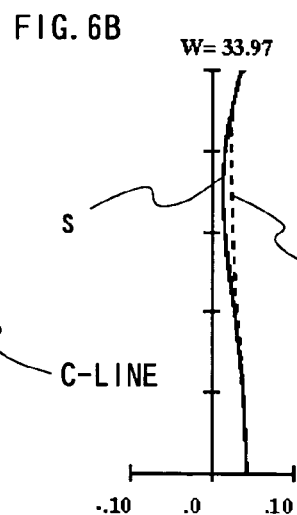
Figure 6C:
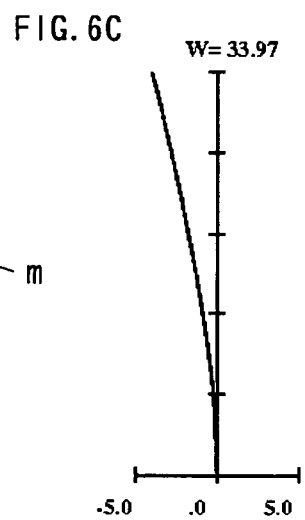
Figure 6D:
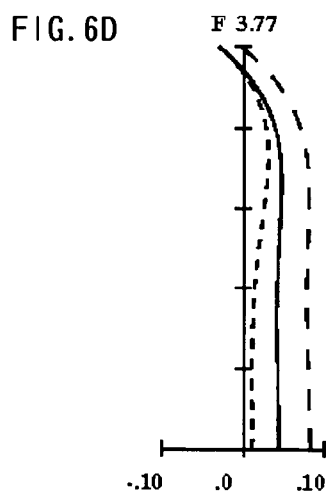
Figure 6E:
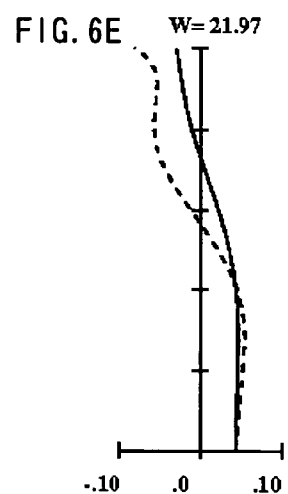
Figure 6F:
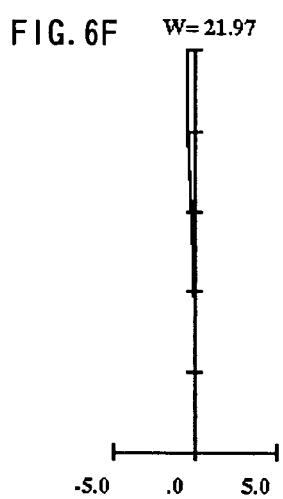
Figure 6G:
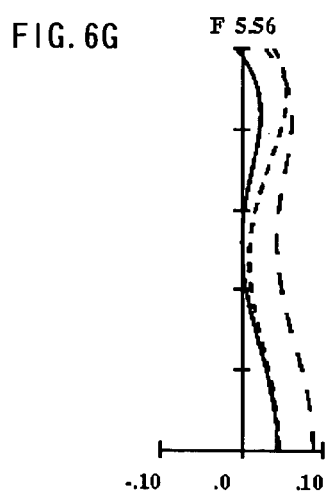
Figure 6H:
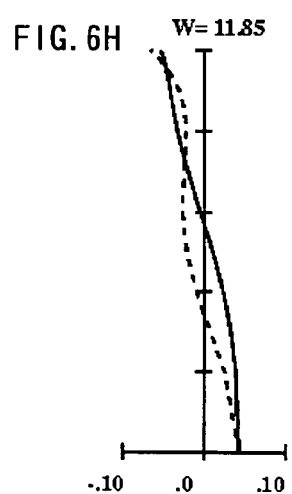
Figure 6I:
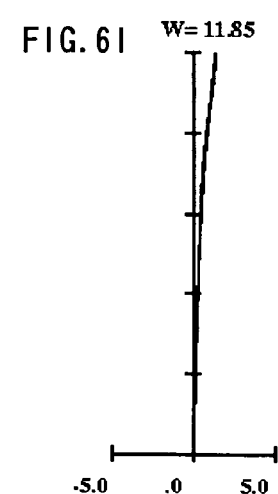

FIGS. 1A to 1C are configuration diagrams of a zoom lens system according to Embodiment 1. FIGS. 3A to 3C are configuration diagrams of a zoom lens system according to Embodiment 2. FIGS. 5A to 5C are configuration diagrams of a zoom lens system according to Embodiment 3. FIGS. 7A to 7C are configuration diagrams of a zoom lens system according to Embodiment 4. Each of FIGS. 1A to 1C, 3A to 3C, 5A to 5C, and 7A to 7C shows a zoom lens system in an infinity in-focus condition. FIGS. 1A, 3A, 5A and 7A show the lens construction at a wide-angle limit (the shortest focal length condition: focal length $f_W$). FIGS. 1B, 3B, 5B and 7B show the lens construction at a middle position (the middle focal length condition: focal length $f_M = \sqrt{(f_W * f_T)}$). FIG. 1C, 3C, 5C and 7C show the lens construction at a telephoto limit (the longest focal length condition: focal length $f_T$).

Each zoom lens system according to Embodiments 1 to 4, in order from the object side to the image side, comprises: a first lens unit G1 having negative optical power; a diaphragm A; a second lens unit G2 having positive optical power; and a third lens unit G3 having positive optical power. In the zoom lens system according to Embodiments 1 to 4, in zooming from the wide-angle limit to the telephoto limit, the first lens unit G1 moves with locus of a convex to the image side, while the second lens unit G2 and the diaphragm A monotonically move to the object side, and while the third lens unit G3 moves with changing the interval with the second lens unit G2. That is, in the zoom lens system according to Embodiments 1 to 4, in zooming from the wide-angle limit to the telephoto limit, the lens units move respectively along the optical axis in such a manner that the interval between the first lens unit G1 and the second lens unit G2 decreases while the interval between the second lens unit G2 and the third lens unit G3 changes. Further, in each of FIGS. 1A to 1C, 3A to 3C, 5A to 5C, and 7A to 7C, a straight line drawn on the rightmost side indicates the position of an image surface S. On its object side, a plane parallel plate P such as an optical low-pass filter, a face plate of an image sensor or the like is provided.

As shown in FIGS. 1A to 1C, in the zoom lens system according to Embodiment 1, the first lens unit G1, in order from the object side to the image side, comprises two lens elements consisting of: a negative meniscus object side negative lens element L1 with the convex surface facing the object side; and a positive meniscus image side positive lens element L2 with the convex surface facing the object side. Each of the object side negative lens element L1 and the image side positive lens element L2 has an aspheric image side surface.

Further, in the zoom lens system according to Embodiment 1, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other and thereby constitute a positive cemented lens element, while the fifth lens element L5 and the sixth lens element L6 are cemented with each other and thereby constitute a positive cemented lens element. Further, the third lens element L3 serving as the most object side lens element of the second lens unit G2 has an aspheric object side surface.

Further, in the zoom lens system according to Embodiment 1, the third lens unit G3 comprises solely a positive meniscus seventh lens element L7 with the convex surface facing the image side. The seventh lens element L7 has an aspheric image side surface.

In the zoom lens system according to Embodiment 1, as shown in Table 13 described later, the image side positive lens element L2 constituting the first lens unit G1 has a notably high refractive index. Thus, in the object side negative lens element L1, the thickness at large light beam height is easily ensured, so that the lens thickness can be reduced. Thus, in the zoom lens system according to Embodiment 1, the overall optical length at the time of non-use is reduced.

As shown in FIGS. 3A to 3C, in the zoom lens system according to Embodiment 2, the first lens unit G1, in order from the object side to the image side, comprises two lens elements consisting of: a negative meniscus object side negative lens element L1 with the convex surface facing the object side; and a positive meniscus image side positive lens element L2 with the convex surface facing the object side. Each of the object side negative lens element L1 and the image side positive lens element L2 has an aspheric image side surface.

In the zoom lens system according to Embodiment 2, the second lens unit G2, in order from the object side to the image side, comprises: a positive meniscus third lens element L3 with the convex surface facing the object side; a positive meniscus fourth lens element L4 with the convex surface facing the object side; a negative meniscus fifth lens element L5 with the convex surface facing the object side; and a bi-convex sixth lens element L6. Among these, the fourth lens element L4 and the fifth lens element L5 are cemented with each other and thereby constitute a cemented lens element. Further, the third lens element L3 serving as the most object side lens element of the second lens unit G2 has an aspheric object side surface.

In the zoom lens system according to Embodiment 2, the third lens unit G3 comprises solely a bi-convex seventh lens element L7. The seventh lens element L7 has an aspheric image side surface.

In the zoom lens system according to Embodiment 2, as shown in Table 13 described later, the image side positive lens element L2 constituting the first lens unit G1 has a comparatively high refractive index. Thus, edge thickness difference is relatively easily ensured even if the lens center thickness is reduced, so that the lens thickness can be reduced. Thus, in the zoom lens system according to Embodiment 2, the overall optical length at the time of non-use is reduced.

As shown in FIGS. 5A to 5C, in the zoom lens system of Embodiment 3, the first lens unit G1, in order from the object side to the image side, comprises two lens elements consisting of: a bi-concave object side negative lens element L1; and a positive meniscus image side positive lens element L2 with the convex surface facing the object side. Each of the object side negative lens element L1 and the image side positive lens element L2 has an aspheric image side surface.

Further, in the zoom lens system according to Embodiment 3, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other and thereby constitute a positive cemented lens element, while the fifth lens element L5 and the sixth lens element L6 are cemented with each other and thereby constitute a positive cemented lens element. Further, the third lens element L3 serving as the most object side lens element of the second lens unit G2 has an aspheric object side surface.

Further, in the zoom lens system according to Embodiment 3, the third lens unit G3 comprises solely a positive meniscus seventh lens element L7 with the convex surface facing the image side. The seventh lens element L7 has an aspheric image side surface.

In the zoom lens system according to Embodiment 3, as shown in Table 13 described later, the object side negative lens element L1 constituting the first lens unit G1 has a low refractive index, while the thickness at large light beam height is small. However, the image side positive lens element L2 of the first lens unit G1 has a comparatively high refractive index and an aspheric surface on the image side. Thus, even when the thickness at large light beam height of the object side negative lens element L1 is small so that the compensation of distortion or curvature of field on the wide-angle limit side is insufficient, in the entire zoom lens system according to Embodiment 3, the compensation effect of the image side positive lens element L2 allows the image side positive lens element L2 to compensate sufficiently the distortion and the curvature of field on the wide-angle limit side.

As shown in FIGS. 7A to 7C, in the zoom lens system according to Embodiment 4, the first lens unit G1, in order from the object side to the image side, comprises two lens elements consisting of: a negative meniscus object side negative lens element L1 with the convex surface facing the object side; and a positive meniscus image side positive lens element L2 with the convex surface facing the object side. Each of the object side negative lens element L1 and the image side positive lens element L2 has an aspheric image side surface.

In the zoom lens system according to Embodiment 4, the second lens unit G2, in order from the object side to the image side, comprises: a bi-convex third lens element L3; a bi-concave fourth lens element L4; a negative meniscus fifth lens element L5 with the convex surface facing the object side; and a bi-convex sixth lens element L6. Among these, the third lens element L3 and the fourth lens element L4 are cemented with each other and thereby constitute a positive cemented lens element, while the fifth lens element L5 and the sixth lens element L6 are cemented with each other and thereby constitute a positive cemented lens element. Further, the third lens element L3 serving as the most object side lens element of the second lens unit G2 has an aspheric object side surface.

In the zoom lens system according to Embodiment 4, the third lens unit G3 comprises solely a bi-convex seventh lens element L7. The seventh lens element L7 has an aspheric image side surface.

In the zoom lens system according to Embodiment 4, the two lens elements L1 and L2 constituting the first lens unit G1 contact with each other in a vicinity where the light beam from the object passes. Thus, the thickness of the entire first lens unit G1 can be reduced. Further, even when the object side negative lens element L1 and the image side positive lens element L2 of the first lens unit G1 approach with each other so that the capability of compensating distortion is degraded, the distortion at the wide-angle limit is compensated satisfactorily in the entire zoom lens system according to Embodiment 4 since the image side positive lens element L2 is a lens element having a comparatively high refractive index as shown in Table 13 described later, and an aspheric surface on the image side.

In the zoom lens system according to Embodiments 1 to 4, the lens units G1 to G3 are arranged in a desired optical power construction so that size reduction is achieved in the entire lens system in a state that excellent optical performance is satisfied.

In particular, in the zoom lens system according to Embodiments 1 to 4, the first lens unit G1 is constructed from: one object side negative lens element; and one image side positive lens element with the convex surface facing the object side. Further, the second lens unit G2 is constructed from two sets of positive cemented lens elements each fabricated by cementing two lens elements, or alternatively has such a construction that one set of cemented lens element is placed between positive lens elements each arranged on the object side or the image side. Furthermore, the third lens unit G3 is constructed from one lens element. As such, the zoom lens system according to Embodiments 1 to 4 realizes a lens system that has a small number of lens elements constituting each lens unit and a short overall optical length at the time of non-use.

As described above, in the zoom lens system according to Embodiments 1 to 4, the second lens unit G2 is constructed from two sets of positive cemented lens elements or alternatively has such a construction that one set of cemented lens element is placed between positive lens elements each arranged on the object side or the image side. Instead, the second lens unit G2 may, in order from the object side to the image side, comprise one set of positive cemented lens element and one positive lens element, so that a lens system can be realized that has a short overall optical length at the time of non-use.

In the zoom lens system according to Embodiments 1 to 4, each of the object side negative lens element and the image side positive lens element constituting the first lens unit G1 has an aspheric surface, while the image side positive lens element has a specific refractive index and a specific Abbe number. Thus, the zoom lens system according to Embodiments 1 to 4 has excellent optical performance, for example, in compensation of curvature of field.

Conditions are described below that are to be satisfied by a zoom lens system like the zoom lens system according to Embodiments 1 to 4, in order from the object side to the image side, comprises a first lens unit having negative optical power, a second lens unit having positive optical power, and a third lens unit having positive optical power, wherein the first lens unit is constructed from: one object side negative lens element; and one image side positive lens element with the convex surface facing the object side, and wherein each of the two lens elements constituting the first lens unit has an aspheric surface. Here, a plurality of conditions to be satisfied are set forth for the zoom lens system according to each embodiment. The construction that satisfies all the conditions is most desirable for the zoom lens system. However, when an individual condition is satisfied, a zoom lens system providing the corresponding effect can be obtained.

For example, in a zoom lens system like the zoom lens system according to Embodiments 1 to 4, the following conditions (1) and (2) are satisfied;

$$n12>1.88 \tag{1}$$

$$v12<26 \tag{2}$$

where, n12 is a refractive index of the image side positive lens element of the first lens unit, and v12 is an Abbe number of the image side positive lens element of the first lens unit.

The conditions (1) and (2) set forth the refractive index and the Abbe number of the image side positive lens element constituting the first lens unit. When these conditions (1) and (2) are satisfied, the center thickness of the image side positive lens element becomes small, while curvature of field on the wide-angle limit side is suppressed without the necessity of a large curvature in the image side surface, so that edge thickness difference is easily ensured. Thus, the thickness of the first lens unit can be reduced. This reduces the thickness of the entire zoom lens system and hence the overall optical length at the time of non-use.

Here, when at least one of the following conditions (1)' and (2)' is satisfied, the above effect is achieved more successfully. When the following condition (1)' is satisfied, the image side positive lens element of the first lens unit can have a large Z value (difference between curvature of the object side surface and curvature of the image side surface), so that the centering of the lens becomes easier. Further, when the following condition (2)' is satisfied, chromatic aberration generated in the first lens unit can be compensated more satisfactorily.

$$n12>1.95 \tag{1)'}$$

$$v12<24 \tag{2)'}$$

Further, for example, in a zoom lens system like the zoom lens system according to Embodiments 1 to 4, it is preferable that the following conditions (3), (4), (5) and (6) are satisfied;

$$n11>1.50 \tag{3}$$

$$v11>35 \tag{4}$$

$$n12-n11>0.10 \tag{5}$$

$$v11-v12>15.0 \tag{6}$$

where, n11 is a refractive index of the object side negative lens element of the first lens unit, v11 is an Abbe number of the object side negative lens element of the first lens unit, n12 is the refractive index of the image side positive lens element of the first lens unit, and v12 is the Abbe number of the image side positive lens element of the first lens unit.

The conditions (3) and (4) set forth the refractive index and the Abbe number of the object side negative lens element constituting the first lens unit. The conditions (5) and (6) relate to conditions for performing satisfactory compensation of chromatic aberration of a zoom lens system where the first lens unit is of negative-lead and has negative optical power while the first lens unit comprises an object side negative lens element and an image side positive lens element. When these conditions (3), (4), (5) and (6) are satisfied, a possibility is avoided that the optical axial thickness of the lens element increases with increasing light beam height and that when the center thickness is increased for the purpose of improvement in manufacturability, the thickness of the entire first lens unit increases further. At the same time, chromatic aberration can be compensated satisfactorily.

Further, when at least one of the following conditions (3)', (4)', (5)' and (6)' is satisfied, the above effect is achieved more successfully. Furthermore, when at least one of the following conditions (4)" and (6)" is satisfied, chromatic aberration generated in the first lens unit can be compensated more satisfactorily.

$$n11>1.75 \tag{3)'}$$

$$v11>38 \tag{4)'}$$

$$65>v11 \tag{4)''}$$

$$n12-n11>0.12 \tag{5)'}$$

$$v11-v12>17.5 \tag{6)'}$$

$$45.0>v11-v12 \tag{6)''}$$

Further, for example, in a zoom lens system like the zoom lens system according to Embodiments 1 to 4, it is preferable that the following condition (7) is satisfied;

$$T1/Y<1.5 \tag{7}$$

where,

T1 is a center thickness of the first lens unit, and

Y is the maximum image height.

The condition (7) sets forth the center thickness of the first lens unit in a zoom lens system where the first lens unit is of negative-lead and has negative optical power, and hence easily becomes large. When the condition (7) is satisfied, a possibility is avoided that the thickness of the first lens unit increases excessively and so does the overall optical length at the time of non-use.

Further, when the following condition (7)' is satisfied, optical power is imparted to the air lens in the first lens unit. Thus, the compensation of curvature of field becomes easier on the wide-angle side.

$$0.8<T1/Y \tag{7)'}$$

Further, for example, in a zoom lens system like the zoom lens system according to Embodiments 1 to 4, it is preferable that the following condition (8) is satisfied;

$$(T1+T2+T3)/Y<3.5 \tag{8}$$

where,

T1 is the center thickness of the first lens unit,

T2 is a center thickness of the second lens unit,

T3 is a center thickness of the third lens unit, and

Y is the maximum image height.

The condition (8) sets forth the total center thickness of the lens units. When the condition (8) is satisfied, a possibility is avoided that the total thickness of the lens units increases excessively and so does the overall optical length at the time of non-use.

When the following condition (8)' is satisfied, the above effect is achieved more successfully. Further, when the following condition (8)" is satisfied, the thickness of each lens unit, especially the thickness of the first lens unit and the thickness of the second lens unit, can be ensured. This permits more satisfactory compensation of curvature of field.

$$(T1+T2+T3)/Y<3.2 \tag{8}'$$

$$2.5<(T1+T2+T3)/Y \tag{8}''$$

Here, the lens units constituting the zoom lens system of Embodiments 1 to 4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Further, in the zoom lens system according to Embodiments 1 to 4, when a reflecting surface may be arranged in the optical path so that the optical path may be bent before or after the zoom lens system or alternatively in the middle. The bending position may be set up arbitrarily depending on the necessity. When the optical path is bent appropriately, thickness reduction in appearance can be achieved in a camera.

Further, the zoom lens system according to Embodiments 1 to 4 has been described for the construction that a plane parallel plate P such as an optical low-pass filter is arranged between the most image side surface of the third lens element G3 and the image surface S. This low-pass filter may be a birefringent type low-pass filter made of, for example, a crystal whose predetermined crystal orientation is adjusted; or a phase type low-pass filter that achieves required characteristics of optical cut-off frequency by diffraction. Further, this plane parallel plate P may be arranged depending on the necessity.

As described above, according to the present invention, a zoom lens system is obtained that compensates curvature of field satisfactorily and that still has a reduced thickness of the first lens unit and a short overall optical length at the time of non-use.

Embodiment 5

Figure 9:
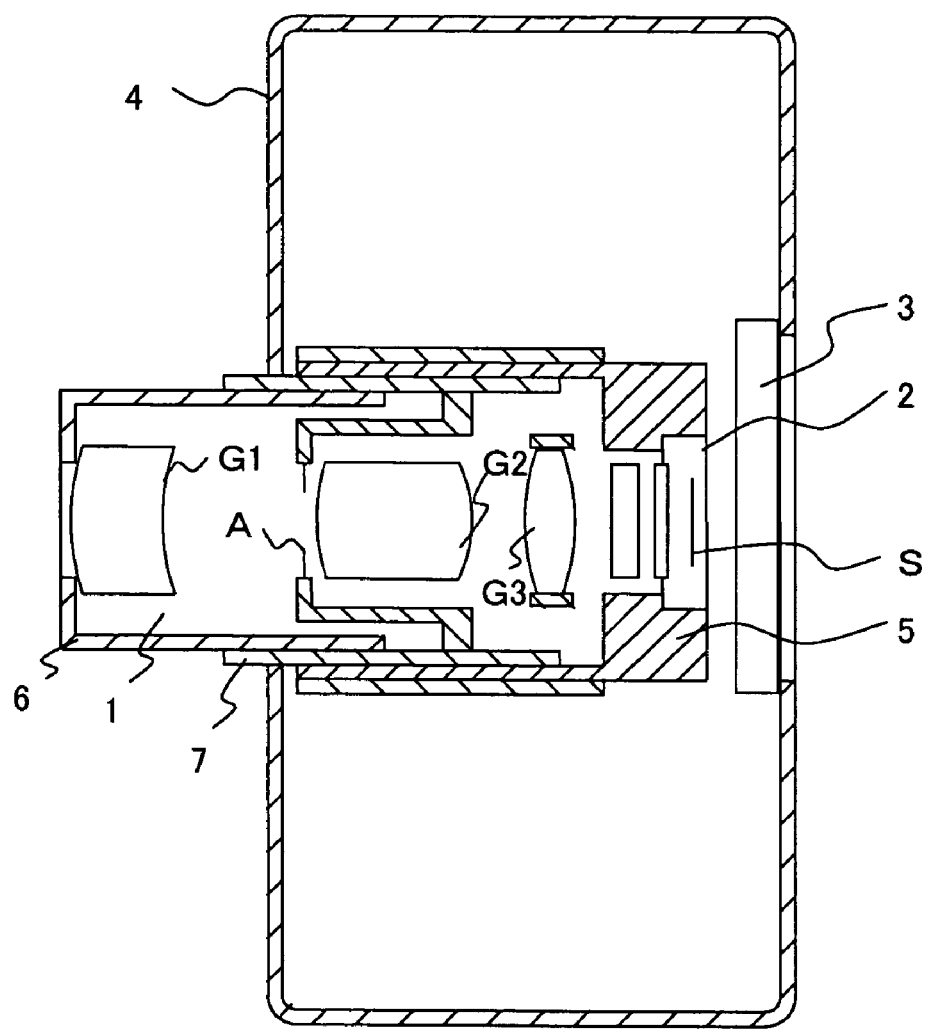
FIG. 9 is a schematic construction diagram of a digital still camera according to Embodiment 5.

FIG. 9 is a schematic construction diagram of a digital still camera according to Embodiment 5. In FIG. 9, the digital still camera comprises: an imaging device including a zoom lens system 1 and an image sensor 2 that is a CCD; a liquid crystal display monitor 3, and a body 4. The employed zoom lens system 1 is the zoom lens system according to Embodiment 1. In FIG. 9, the zoom lens system 1 comprises a first lens unit G1, a diaphragm A, a second lens unit G2, and a third lens unit G3. In the body 4, the zoom lens system 1 is arranged on the front side, while the image sensor 2 is arranged on the rear side of the zoom lens system 1. The liquid crystal display monitor 3 is arranged on the rear side of the body 4, while an optical image of a photographic object acquired through the zoom lens system 1 is formed on the image surface S.

The lens barrel comprises a main barrel 5, a moving barrel 6, and a cylindrical cam 7. When the cylindrical cam 7 is rotated, the first lens unit G1, the second lens unit G2, and the third lens unit G3 move to predetermined positions relative to the image sensor 2, so that variable magnification can be achieved ranging from the wide-angle limit to the telephoto limit. The third lens unit G3 is movable in the optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall optical length at the time of non-use. Here, in the digital still camera shown in FIG. 9, any one of the zoom lens systems according to Embodiments 2 to 4 may be employed in place of the zoom lens system according to Embodiment 1. Further, the optical system of the digital still camera shown in FIG. 9 may be applied to a digital video camera for moving images. In this case, moving images with high resolution can be acquired in addition to still images.

An imaging device comprising a zoom lens system according to Embodiments 1 to 4 described above and an image sensor such as a CCD or a CMOS may be applied to a mobile telephone, a PDA (Personal Digital Assistance), a surveillance camera in a surveillance system, a Web camera, a vehicle-mounted camera or the like.

Hereinafter, numerical examples which are actual implementations of the zoom lens systems according to Embodiments 1 to 4 will be described. In the numerical examples, the units of the length in the tables are all "mm". Moreover, r is the radius of curvature, d is the axial distance, nd is the refractive index to the d-line, and vd is the Abbe number to the d-line. In the numerical examples, the surfaces marked with * are aspherical surfaces, and the sag z of the aspherical surface is defined by the following expression:

$$z = \frac{ch^2}{1+\sqrt{\{1-(1+k)c^2h^2\}}} + Ah^4 + Bh^6 + Ch^8 + Dh^{10} + Eh^{12}$$

Here, h is the height from the optical axis, c is the curvature, k is the conic constant, and A, B, C, D and E are the fourth-order, sixth-order, eighth-order, tenth-order and twelfth-order aspherical coefficients, respectively.

EXAMPLE 1

A zoom lens system of Example 1 corresponds to Embodiment 1 shown in FIGS. 1A to 1C. Table 1 shows the lens data of the zoom lens system of Example 1. Table 2 shows the aspherical data. Table 3 shows the focal length f, the F-number, the view angle 2ω, the overall optical length L, and the variable axial distance data d4, d11 and d13, when the shooting distance is infinity.

TABLE 1

| Lens unit | Lens element | Surface | r | d | nd | vd |
|---|---|---|---|---|---|---|
| G1 | L1 | 1 | 51.824 | 1.100 | 1.805 | 41.0 |
|  |  | *2 | 6.287 | 2.433 |  |  |
|  | L2 | 3 | 12.887 | 1.400 | 2.400 | 17.0 |
|  |  | *4 | 17.651 | Variable |  |  |
| Diaphragm |  | 5 | ∞ | 0.300 |  |  |
| G2 | L3 | *6 | 4.617 | 1.900 | 1.805 | 41.0 |
|  | L4 | 7 | 30.191 | 0.500 | 1.717 | 29.5 |
|  |  | 8 | 4.069 | 0.600 |  |  |
|  | L5 | 9 | 19.289 | 0.600 | 1.620 | 36.3 |
|  | L6 | 10 | 4.413 | 1.200 | 1.589 | 61.3 |
|  |  | 11 | −12.764 | Variable |  |  |
| G3 | L7 | 12 | −237.873 | 1.100 | 1.665 | 55.2 |
|  |  | *13 | −15.297 | Variable |  |  |
| P |  | 14 | ∞ | 0.900 | 1.517 | 64.2 |
|  |  | 15 | ∞ | 0.870 |  |  |

TABLE 2

| Surface | k | A | B | C | D | E |
|---|---|---|---|---|---|---|
| 2 | −3.612E−01 | 7.170E−06 | −3.185E−06 | −1.903E−09 | −1.340E−09 | 0.000E+00 |
| 4 | 0.000E+00 | −9.258E−05 | 1.154E−06 | 0.000E+00 | 0.000E+00 | 0.000E+00 |
| 6 | 0.000E+00 | −5.397E−04 | −1.839E−05 | 1.169E−07 | −3.148E−08 | 0.000E+00 |
| 13 | 0.000E+00 | 4.422E−04 | −5.274E−05 | 6.216E−06 | −3.426E−07 | 7.090E−09 |

TABLE 3

| Axial distance | Wide-angle limit | Middle position | Telephoto limit |
|---|---|---|---|
| d4 | 14.79 | 8.07 | 2.37 |
| d11 | 2.70 | 9.09 | 19.06 |
| d13 | 6.10 | 4.47 | 2.64 |
| f | 5.36 | 8.81 | 16.71 |
| F-number | 2.98 | 3.86 | 5.66 |
| 2ω | 70.01 | 44.60 | 23.97 |
| L | 36.50 | 34.53 | 36.96 |

TABLE 6

| Axial distance | Wide-angle limit | Middle position | Telephoto limit |
|---|---|---|---|
| d4 | 16.24 | 6.86 | 1.68 |
| d12 | 2.70 | 7.90 | 17.30 |
| d14 | 4.39 | 3.93 | 2.60 |
| f | 4.83 | 8.79 | 16.50 |
| F-number | 2.99 | 3.96 | 5.91 |
| 2ω | 75.75 | 45.08 | 24.67 |
| L | 36.58 | 31.92 | 34.84 |

EXAMPLE 2

A zoom lens system of Example 2 corresponds to Embodiment 2 shown in FIGS. 3A to 3C. Table 4 shows the lens data of the zoom lens system of Example 2. Table 5 shows the aspherical data. Table 6 shows the focal length f, the F-number, the view angle 2ω, the overall optical length L, and the variable axial distance data d4, d12 and d14, when the shooting distance is infinity.

TABLE 4

| Lens unit | Lens element | Surface | r | d | nd | νd |
|---|---|---|---|---|---|---|
| G1 | L1 | 1 | 97.238 | 1.300 | 1.878 | 38.2 |
|  |  | *2 | 6.116 | 2.181 |  |  |
|  | L2 | 3 | 15.696 | 1.778 | 1.996 | 20.5 |
|  |  | *4 | 62.842 | Variable |  |  |
| Diaphragm |  | 5 | ∞ | 0.300 |  |  |
| G2 | L3 | *6 | 4.711 | 1.500 | 1.804 | 40.8 |
|  |  | 7 | 20.931 | 0.300 |  |  |
|  | L4 | 8 | 8.092 | 0.800 | 1.697 | 55.5 |
|  | L5 | 9 | 52.433 | 0.400 | 1.805 | 25.5 |
|  |  | 10 | 3.521 | 0.419 |  |  |
|  | L6 | 11 | 24.775 | 0.993 | 1.697 | 55.5 |
|  |  | 12 | −24.775 | Variable |  |  |
| G3 | L7 | 13 | 33.551 | 1.438 | 1.518 | 70.3 |
|  |  | *14 | −15.270 | Variable |  |  |
| P |  | 15 | ∞ | 0.900 | 1.517 | 64.2 |
|  |  | 16 | ∞ | 0.870 |  |  |

EXAMPLE 3

A zoom lens system of Example 3 corresponds to Embodiment 3 shown in FIGS. 5A to 5C. Table 7 shows the lens data of the zoom lens system of Example 3. Table 8 shows the aspherical data. Table 9 shows the focal length f, the F-number, the view angle 2ω, the overall optical length L, and the variable axial distance data d4, d11 and d13, when the shooting distance is infinity.

TABLE 7

| Lens unit | Lens element | Surface | r | d | nd | νd |
|---|---|---|---|---|---|---|
| G1 | L1 | 1 | −84.423 | 1.100 | 1.514 | 63.3 |
|  |  | *2 | 5.404 | 2.309 |  |  |
|  | L2 | 3 | 14.387 | 1.600 | 1.900 | 24.0 |
|  |  | *4 | 26.719 | Variable |  |  |
| Diaphragm |  | 5 | ∞ | 0.300 |  |  |
| G2 | L3 | *6 | 4.964 | 1.900 | 1.805 | 41.0 |
|  | L4 | 7 | 144.593 | 0.500 | 1.717 | 29.5 |
|  |  | 8 | 4.496 | 0.600 |  |  |
|  | L5 | 9 | 43.557 | 0.600 | 1.620 | 36.3 |
|  | L6 | 10 | 6.034 | 1.200 | 1.589 | 61.3 |
|  |  | 11 | −10.835 | Variable |  |  |
| G3 | L7 | 12 | −237.873 | 1.100 | 1.665 | 55.2 |
|  |  | *13 | −14.202 | Variable |  |  |
| P |  | 14 | ∞ | 0.900 | 1.517 | 64.2 |
|  |  | 15 | ∞ | 0.870 |  |  |

TABLE 5

| Surface | k | A | B | C | D | E |
|---|---|---|---|---|---|---|
| 2 | −7.285E−01 | 1.632E−04 | −1.177E−05 | 3.548E−07 | −1.538E−09 | 0.000E+00 |
| 4 | 0.000E+00 | −1.619E−04 | 7.984E−06 | −2.917E−07 | 2.109E−09 | 0.000E+00 |
| 6 | −1.425E−01 | −4.078E−04 | 1.138E−05 | −7.290E−06 | 7.546E−07 | 0.000E+00 |
| 14 | 0.000E+00 | 2.119E−04 | −1.102E−05 | 1.904E−07 | 1.254E−08 | −4.126E−10 |

TABLE 8

| Surface | k | A | B | C | D | E |
|---|---|---|---|---|---|---|
| 2 | −6.222E−01 | 2.697E−04 | −9.608E−06 | −1.996E−07 | 4.805E−09 | 0.000E+00 |
| 4 | 0.000E+00 | −2.732E−04 | 9.958E−06 | −1.370E−07 | 0.000E+00 | 0.000E+00 |
| 6 | 0.000E+00 | −5.198E−04 | −1.810E−05 | 1.721E−06 | −1.330E−07 | 0.000E+00 |
| 13 | 0.000E+00 | 4.072E−04 | −5.130E−05 | 6.943E−06 | −4.141E−07 | 9.128E−09 |

TABLE 9

| Axial distance | Wide-angle limit | Middle position | Telephoto limit |
|---|---|---|---|
| d4 | 14.38 | 8.04 | 2.03 |
| d11 | 2.70 | 9.14 | 19.40 |
| d13 | 6.45 | 4.83 | 2.60 |
| f | 5.57 | 8.82 | 16.70 |
| F-number | 2.94 | 3.77 | 5.56 |
| 2ω | 67.94 | 43.94 | 23.71 |
| L | 35.61 | 34.10 | 36.11 |

EXAMPLE 4

A zoom lens system of Example 4 corresponds to Embodiment 4 shown in FIGS. 7A to 7C. Table 10 shows the lens data of the zoom lens system of Example 4. Table 11 shows the aspherical data. Table 12 shows the focal length f, the F-number, the view angle 2ω, the overall optical length L, and the variable axial distance data d4, d11 and d13, when the shooting distance is infinity.

TABLE 10

| Lens unit | Lens element | Surface | r | d | nd | vd |
|---|---|---|---|---|---|---|
| G1 | L1 | 1 | 96.707 | 1.100 | 1.878 | 38.2 |
|  |  | *2 | 5.757 | 1.219 |  |  |
|  | L2 | 3 | 9.382 | 1.778 | 1.996 | 20.5 |
|  |  | *4 | 22.204 | Variable |  |  |
| Diaphragm |  | 5 | ∞ | 0.300 |  |  |
| G2 | L3 | *6 | 4.225 | 1.500 | 1.805 | 41.0 |
|  | L4 | 7 | −50.000 | 0.600 | 1.717 | 29.5 |
|  |  | 8 | 3.642 | 0.600 |  |  |
|  | L5 | 9 | 15.017 | 0.600 | 1.620 | 36.3 |
|  | L6 | 10 | 5.586 | 1.500 | 1.589 | 61.3 |
|  |  | 11 | −16.364 | Variable |  |  |
| G3 | L7 | 12 | 100.000 | 1.100 | 1.665 | 55.2 |
|  |  | *13 | −15.520 | Variable |  |  |
| P |  | 14 | ∞ | 0.900 | 1.517 | 64.2 |
|  |  | 15 | ∞ | 0.870 |  |  |

TABLE 11

| Surface | k | A | B | C | D | E |
|---|---|---|---|---|---|---|
| 2 | −7.802E−01 | 5.551E−05 | 1.727E−07 | −1.998E−07 | 6.955E−09 | 0.000E+00 |
| 4 | 0.000E+00 | −4.846E−05 | 3.420E−06 | 4.006E−08 | −4.178E−09 | 0.000E+00 |
| 6 | 0.000E+00 | −6.412E−04 | −4.796E−05 | 6.036E−06 | −6.470E−07 | 0.000E+00 |
| 13 | 0.000E+00 | 7.442E−04 | −9.347E−05 | 9.894E−06 | −5.255E−07 | 1.088E−08 |

TABLE 12

| Axial distance | Wide-angle limit | Middle position | Telephoto limit |
|---|---|---|---|
| d4 | 16.77 | 7.10 | 2.17 |
| d11 | 2.70 | 8.24 | 17.94 |
| d13 | 4.97 | 4.43 | 2.64 |
| f | 4.75 | 8.81 | 16.43 |
| F-number | 2.78 | 3.66 | 5.40 |
| 2ω | 76.50 | 44.06 | 24.09 |
| L | 36.51 | 31.84 | 34.82 |

Table 13 shows values corresponding to the conditions in Examples 1 to 4.

TABLE 13

|  |  | Example | | | |
|---|---|---|---|---|---|
|  | Condition | 1 | 2 | 3 | 4 |
| (1) | n12 | 2.40 | 2.00 | 1.90 | 2.00 |
| (2) | v12 | 17.0 | 20.5 | 24.0 | 20.5 |
| (3) | n11 | 1.80 | 1.88 | 1.51 | 1.88 |
| (4) | v11 | 40.95 | 38.20 | 63.28 | 38.20 |
| (5) | n12 − n11 | 0.60 | 0.12 | 0.39 | 0.12 |
| (6) | v11 − v12 | 23.95 | 17.67 | 39.28 | 17.67 |
| (7) | T1/Y | 1.37 | 1.46 | 1.39 | 1.14 |
| (8) | (T1 + T2 + T3)/Y | 3.01 | 3.09 | 3.03 | 2.78 |
|  | T1 | 4.93 | 5.26 | 5.01 | 4.10 |
|  | T2 | 4.80 | 4.41 | 4.80 | 4.80 |
|  | T3 | 1.10 | 1.44 | 1.10 | 1.10 |
|  | T1 + T2 + T3 | 10.83 | 11.11 | 10.91 | 10.00 |
|  | Y | 3.60 | 3.60 | 3.60 | 3.60 |

FIGS. 2A to 2I are longitudinal aberration diagrams of a zoom lens system according to Example 1. FIGS. 4A to 4I are longitudinal aberration diagrams of a zoom lens system according to Example 2. FIGS. 6A to 6I are longitudinal aberration diagrams of a zoom lens system according to Example 3. FIGS. 8A to 8I are longitudinal aberration diagrams of a zoom lens system according to Example 4.

FIGS. 2A to 2C, 4A to 4C, 6A to 6C, and 8A to 8C show the longitudinal aberration at the wide-angle limit. FIGS. 2D to 2F, 4D to 4F, 6D to 6F, and 8D to 8F show the longitudinal aberration at an approximate middle position. FIGS. 2G to 2I, 4G to 4I, 6G to 6I, and 8G to 8I show the longitudinal aberration at the telephoto limit. FIGS. 2A, 2D, 2G, 4A, 4D, 4G, 6A, 6D, 6G, 8A, 8D and 8G are spherical aberration diagrams. FIGS. 2B, 2E, 2H, 4B, 4E, 4H, 6B, 6E, 6H, 8B, 8E and 8H are astigmatism diagrams. FIGS. 2C, 2F, 2I, 4C, 4F, 4I, 6C, 6F, 6I, 8C, 8F and 8I are distortion diagrams. In each spherical aberration diagram, the vertical axis indicates the F-number, and the solid line, the short dash line and the long dash line indicate the characteristics to the d-line, the F-line and the C-line, respectively. In each astigmatism diagram, the vertical axis indicates the half view angle ω, and the solid line and the dash line indicate the characteristics to the sagittal image plane (in each Fig., indicated as "s") and the meridional image plane (in each Fig., indicated as "m"), respectively. In each distortion diagram, the vertical axis indicates the half view angle ω.

The zoom lens system according to the present invention is applicable to a camera such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for a camera such as a digital still camera or a digital video camera requiring high image quality.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zoom lens system for forming an optical image of an object with a variable magnification, in order from the object side to the image side, comprising: a first lens unit having negative optical power; a second lens unit having positive optical power; and a third lens unit having positive optical power, wherein in zooming from a wide-angle limit to a telephoto limit, the lens units move respectively along an optical axis in such a manner that an interval between the first lens unit and the second lens unit decreases while an interval between the second lens unit and the third lens unit changes so that the variable magnification is achieved, the first lens unit comprises: one object side negative lens element; and one image side positive lens element with a convex surface facing the object side, the second lens unit has at least three lens elements, each of the two lens elements constituting the first lens unit has an aspheric surface, and the following conditions (1) and (2) are satisfied:

$$n12 > 1.88 \quad (1)$$

$$v12 < 26 \quad (2)$$

where, n12 is a refractive index of the image side positive lens element of the first lens unit, and v12 is an Abbe number of the image side positive lens element of the first lens unit.

2. The zoom lens system as claimed in claim 1, satisfying the following conditions (3), (4), (5) and (6):

$$n11 > 1.50 \quad (3)$$

$$v11 > 35 \quad (4)$$

$$n12 - n11 > 0.10 \quad (5)$$

$$v11 - v12 > 15.0 \quad (6)$$

where, n11 is a refractive index of the object side negative lens element of the first lens unit, v11 is an Abbe number of the object side negative lens element of the first lens unit, n12 is the refractive index of the image side positive lens element of the first lens unit, and v12 is the Abbe number of the image side positive lens element of the first lens unit.

3. The zoom lens system as claimed in claim 1, satisfying the following condition (7):

$$T1/Y < 1.5 \quad (7)$$

where,

T1 is a center thickness of the first lens unit, and

Y is the maximum image height.

4. The zoom lens system as claimed in claim 1, satisfying the following condition (8):

$$(T1+T2+T3)/Y < 3.5 \quad (8)$$

where,

T1 is a center thickness of the first lens unit,

T2 is a center thickness of the second lens unit,

T3 is a center thickness of the third lens unit, and

Y is the maximum image height.

5. The zoom lens system as claimed in claim 1, wherein the third lens unit is composed of one lens element.

6. The zoom lens system as claimed in claim 1, wherein an object side surface of the most object side lens element that constitutes the second lens unit is aspheric, and wherein the second lens unit, in order from the object side to the image side, comprises one set of positive cemented lens element and one positive lens element, or alternatively comprises one positive lens element, one set of cemented lens element and one positive lens element, or alternatively comprises two sets of positive cemented lens elements.

7. An imaging device capable of converting an optical image of a photographic object into an electric image signal and then outputting the signal, comprising:

a zoom lens system that forms the optical image of the photographic object with a variable magnification; and an image sensor that converts the optical image of the photographic object formed by the zoom lens system into the electric image signal, wherein the zoom lens system, in order from the object side serving as the photographic object side to the image side, comprises: a first lens unit having negative optical power; a second lens unit having positive optical power; and a third lens unit having positive optical power, in zooming from a wide-angle limit to a telephoto limit, the lens units move respectively along an optical axis in such a manner that an interval between the first lens unit and the second lens unit decreases while an interval between the second lens unit and the third lens unit changes so that the variable magnification is achieved, the first lens unit comprises: one object side negative lens element; and one image side positive lens element with a convex surface facing the object side, the second lens unit has at least three lens elements;

each of the two lens elements constituting the first lens unit has an aspheric surface, and the following conditions (1) and (2) are satisfied:

$$n12 > 1.88 \quad (1)$$

$$v12 < 26 \quad (2)$$

where,
n12 is a refractive index of the image side positive lens element of the first lens unit, and
v12 is an Abbe number of the image side positive lens element of the first lens unit.

8. The imaging device as claimed in claim 7, wherein the zoom lens system satisfies the following conditions (3), (4), (5) and (6):

$$n11 > 1.50 \quad (3)$$

$$v11 > 35 \quad (4)$$

$$n12 - n11 > 0.10 \quad (5)$$

$$v11 - v12 > 15.0 \quad (6)$$

where,
n11 is a refractive index of the object side negative lens element of the first lens unit,
v11 is an Abbe number of the object side negative lens element of the first lens unit,
n12 is the refractive index of the image side positive lens element of the first lens unit, and
v12 is the Abbe number of the image side positive lens element of the first lens unit.

9. The imaging device as claimed in claim 7, wherein the zoom lens system satisfies the following condition (7):

$$T1/Y < 1.5 \quad (7)$$

where,
T1 is a center thickness of the first lens unit, and
Y is the maximum image height.

10. The imaging device as claimed in claim 7, wherein the zoom lens system satisfies the following condition (8):

$$(T1+T2+T3)/Y < 3.5 \quad (8)$$

where,
T1 is a center thickness of the first lens unit,
T2 is a center thickness of the second lens unit,
T3 is a center thickness of the third lens unit, and
Y is the maximum image height.

11. The imaging device as claimed in claim 7, wherein the third lens unit of the zoom lens system is composed of one lens element.

12. The imaging device as claimed in claim 7, wherein an object side surface of the most object side lens element that constitutes the second lens unit of the zoom lens system is aspheric, and wherein
the second lens unit, in order from the object side to the image side, comprises one set of positive cemented lens element and one positive lens element, or alternatively comprises one positive lens element, one set of cemented lens element and one positive lens element, or alternatively comprises two sets of positive cemented lens elements.

13. A camera capable of shooting a photographic object and then outputting its image as an electric image signal, comprising:
an imaging device including a zoom lens system that forms the optical image of the photographic object with a variable magnification, and an image sensor that converts the optical image of the photographic object formed by the zoom lens system into the electric image signal, wherein
the zoom lens system, in order from the object side serving as the photographic object side to the image side, comprises: a first lens unit having negative optical power; a second lens unit having positive optical power; and a third lens unit having positive optical power,
in zooming from a wide-angle limit to a telephoto limit, the lens units move respectively along an, optical axis in such a manner that an interval between the first lens unit and the second lens unit decreases while an interval between the second lens unit and the third lens unit changes so that the variable magnification is achieved,
the first lens unit comprises: one object side negative lens element; and one image side positive lens element with a convex surface facing the object side,
the second lens unit has at least three lens elements;
each of the two lens elements constituting the first lens unit has an aspheric surface, and
the following conditions (1) and (2) are satisfied:

$$n12 > 1.88 \quad (1)$$

$$v12 < 26 \quad (2)$$

where,
n12 is a refractive index of the image side positive lens element of the first lens unit, and
v12 is an Abbe number of the image side positive lens element of the first lens unit.

14. The camera as claimed in claim 13, wherein the camera is a digital still camera capable of acquiring a still image of the photographic object.

15. The camera as claimed in claim 13, wherein the camera is a digital video camera capable of acquiring a moving image of the photographic object.

* * * * *